H. K. SMITH.
CAN SOLDERING MACHINE.
APPLICATION FILED MAY 22, 1907.
925,045.
Patented June 15, 1909.
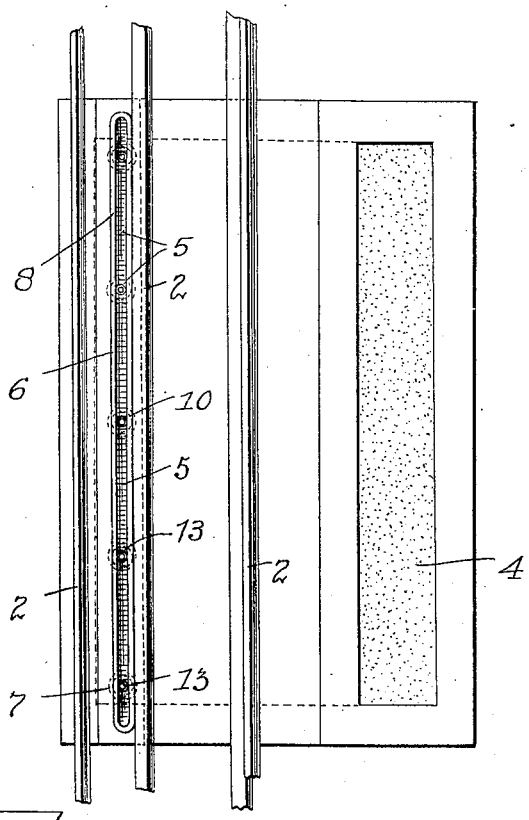
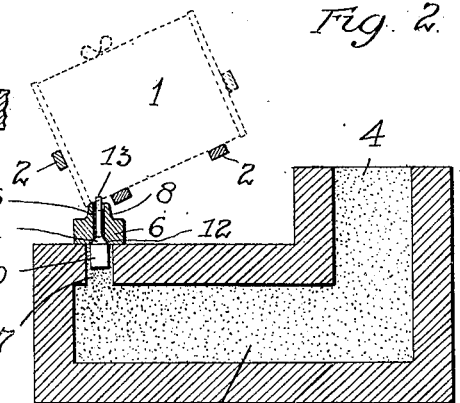
Attest:
Beatrice G. Phillips.
Edward N. Sarton
Inventor:
Harry K. Smith
by Spear, Middleton, Donaldson & Spear
Attys
THE NORRIS PETERS CO., WASHINGTON, D. C.

UNITED STATES PATENT OFFICE.

HARRY KING SMITH, OF FEDERALSBURG, MARYLAND.

CAN-SOLDERING MACHINE.

No. 925,045.  Specification of Letters Patent.  Patented June 15, 1909.

Application filed May 22, 1907. Serial No. 375,082.

*To all whom it may concern:*

Be it known that I, HARRY K. SMITH, citizen of the United States, residing at Federalsburg, Maryland, have invented certain new and useful Improvements in Can-Soldering Machines, of which the following is a specification.

My invention is an improvement in can soldering machines, and is an advance in the art as it now exists, in that class of machines in which a solder bath is used, past which the cans are moved to have the solder applied to the seam thereof.

It is the object of my invention to provide means whereby the application of the molten solder may be confined to a limited zone on the can so that waste of solder is prevented and the appearance of the can is not detracted from by having solder applied to portions of the body and head other than directly at the seam.

In carrying out my invention, the cans are caused to traverse the apparatus by any suitable means such as an endless chain or conveyer, and in their movement in one form of my invention they are brought in succession to a narrow groove or channel to which molten solder is supplied. This channel or groove being of such width and location in respect to the can that said molten solder will be directed to the seam and will not be spread to the adjacent parts of the body and head.

Another phase of my invention relates to the means for controlling the feed of molten solder by which, when the can arrives at the point to be soldered a supply of molten solder is released so as to be applied to the can and I prefer to control the release or feeding action of the molten solder by the presence of the can itself though I do not wish to be limited in this respect.

The invention consists in the features and combination and arrangement of parts hereinafter described and particularly pointed out in the claim.

In the accompanying drawings, Figure 1 is a plan view of my improvements. Fig. 2 is a sectional view of the solder bath showing the outline of the can in its relation thereto and the guides or ways upon which the cans move. Figs. 3 and 4 are detail views of a modification.

In these drawings, 1 indicates the can to be soldered, which can travels upon guides or ways made up of the bars 2, the can being held by said ways in inclined position and being moved along them for instance by a chain bearing upon their upper peripheries, and rolling them along the ways. The bath of molten solder is indicated at 3, this having a horizontal portion and a vertically extending portion 4 to act as a reservoir, the outlet for the molten solder from said bath being at a point below the level of the top of the reservoir portion. This outlet in the form of my invention, which I have selected to disclose its fundamental principles, but to which I wish it understood that I do not limit myself, consists of an elongated channel, groove or slit 5, formed preferably in a bar or cap 6, which is secured to the upper surface of the solder bath over the elongated opening or channel 7 therein. This cap piece or bar 6 is provided with upwardly extending flanges 8, beveled or rounded at their upper ends so as to allow the inclined cans to assume a position close to the channel or slit 5.

The relation of the parts is such that the cans in rolling along the ways present their end seams directly to the slit or elongated channel 5, and receive the molten solder therefrom, this solder having a tendency to rise through the channel under the weight of that portion of the solder which is in the elevated reservoir portion 4 of the solder bath. By this means the solder is directed only to the points where it is needed to be sweated into the seam and by reason of the narrowness of the groove or channel 5, only a limited quantity of the molten solder is directed upon the can.

In order to control the amount of solder in the channel or slit 5 I provide a valve or valves 10 having conical formation at 11, adapted to be seated against the conical seat 12, in the bar or cap 6, the said valve having a stem 13 extending upwardly therefrom through the slit or channel and slightly above the flanges 8, so that the cans as they roll along the ways will, by engaging the said stem, force the same downwardly and thus allow solder to feed from the bath into the channel or slit and thence to the can which is traversing the channel. I prefer to employ a plurality of these valves so that the molten solder will be supplied to the channel and thence to the can by a series of actions as the can is passing the solder appliance. I have shown five such valves in Fig. 1, though I do not limit myself to any particular number.

My invention here consists particularly in means whereby molten solder may be fed intermittently as the cans arrive in position to be soldered and preferably by the action of the cans themselves, though I do not limit myself in this, neither do I limit myself to an under feed of the molten solder.

It will be observed that in carrying out my invention the head or end of the can is not dipped into a bath of molten solder, but on the contrary the end or head is kept free from contact with said solder which is directed only to a narrow zone at the seam.

It will be understood that the valve may be arranged so as to direct the solder on to the seam without the use of the channel. In this form of my invention the molten solder is discharged through the valve directly upon the seam.

Figs. 3 and 4 are detail views of an arrangement of valves in which the elongated channel is not employed. In this case a flared mouth or depression is formed at the outer end of the discharge opening leading from the molten solder supply chamber into which the metal may be permitted to flow by depressing the valve. From this basin or flared mouth 14 the can will readily gather the molten solder so as to have it sweated into the seam and by providing a series of these valve controlled basins or depressions the solder may be applied at a number of points on the can as it passe, by these depressions in succession.

I claim as my invention:—

In combination in a soldering machine, a solder bath, a solder containing channel or groove supplied therefrom, and a support for the moving cans located above the solder channel, the cans being directed to the groove with the extremity extending beyond the groove, whereby the solder is supplied to the seam only and the ends of the can are kept free from contact with the solder, substantially as described.

In testimony whereof, I affix my signature in presence of two witnesses.

HARRY KING SMITH.

Witnesses:
 E. S. HALL,
 CARY D. HALL, Jr.